T. E. JENNINGS.
AUTOMATIC AIR BRAKE COUPLING.
APPLICATION FILED OCT. 24, 1910.
982,004.
Patented Jan. 17, 1911.
2 SHEETS—SHEET 1.
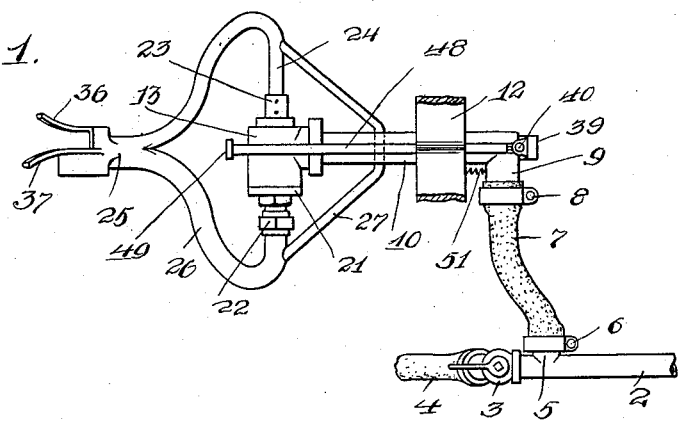
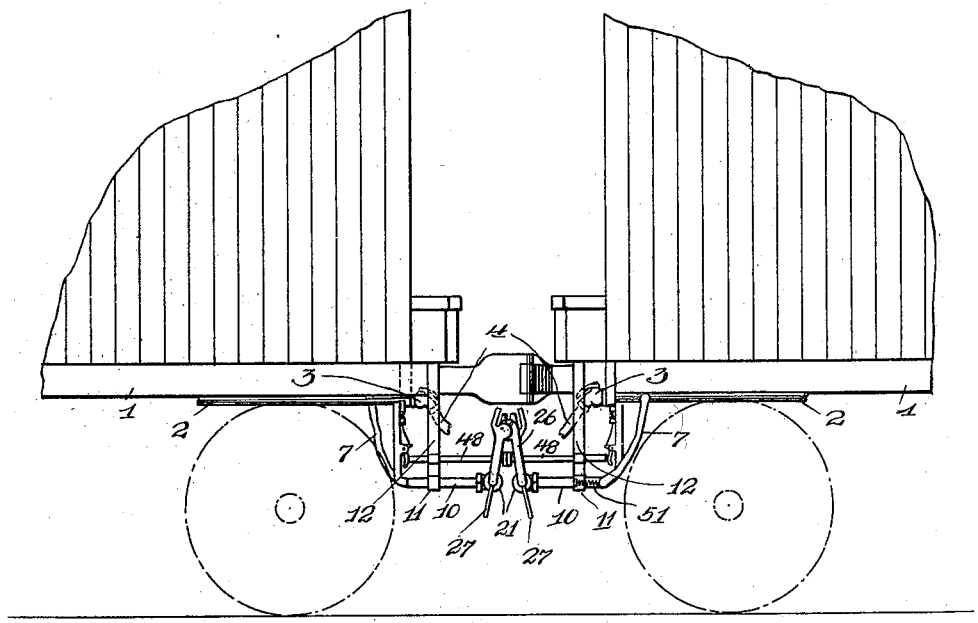
WITNESSES
INVENTOR
T. E. Jennings
by
Attorneys.
THE NORRIS PETERS CO., WASHINGTON, D. C.

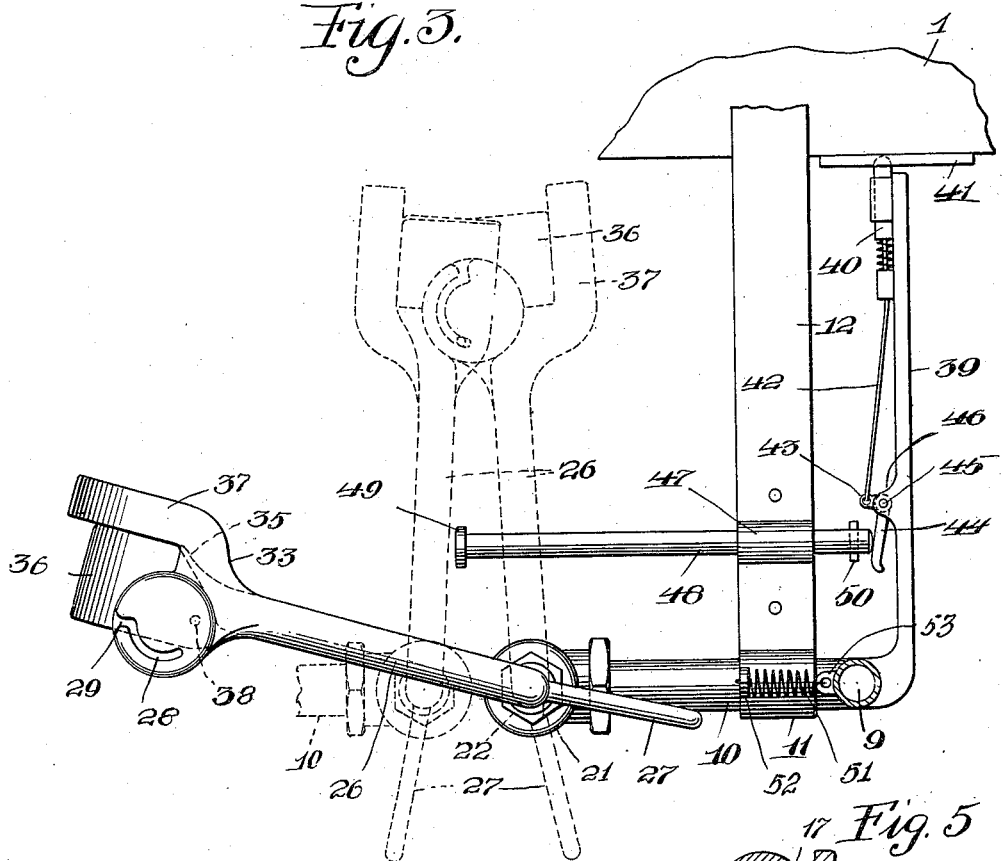

UNITED STATES PATENT OFFICE.

THOMAS E. JENNINGS, OF SCOTT HAVEN, PENNSYLVANIA.

AUTOMATIC AIR-BRAKE COUPLING.

982,004. Specification of Letters Patent. Patented Jan. 17, 1911.

Application filed October 24, 1910. Serial No. 588,691.

*To all whom it may concern:*

Be it known that I, THOMAS E. JENNINGS, a citizen of the United States of America, residing at Scott Haven, State of Pennsylvania, have invented certain new and useful Improvements in Automatic Air-Brake Couplers, of which the following is a specification, reference being had therein to the accompanying drawing.

This invention relates to automatic air brake couplers for cars, and the object of the invention is the provision of positive and reliable means in a manner as will be hereinafter set forth for connecting the air lines of two cars, without necessitating the presence of trainmen between cars, thereby eliminating a great many accidents that occur when coupling cars.

A further object of the invention is to provide an automatic coupler that can be used in connection with the ordinary air couplings, and that will adjust itself to the various movements and vibrations of cars when in motion.

A still further object of the invention is to provide a coupler of the above type that is non-leakable, strong and durable, easy to install and efficient for the purposes for which it is intended.

With the above and such other objects in view as may hereinafter appear, the invention consists of the novel construction, combination and arrangement of parts to be hereinafter specifically described and then claimed.

Reference will now be had to the drawings forming part of this specification, wherein there is illustrated a preferred embodiment of the invention, but it is to be understood that the structural elements thereof can be varied or changed without departing from the spirit and scope of the invention.

In the drawings:—Figure 1 is a plan of one of the couplers, Fig. 2 is a side elevation of a portion of two cars equipped with the couplers, Fig. 3 is an enlarged side elevation of one of the couplers, showing in dotted lines two of the couplers connected, Fig. 4 is a plan of the coupler, partly broken away and partly in section, and Fig. 5 is a cross sectional view of one of the valves forming part of the coupler.

As the couplers of the car are identical in construction, I deem it only necessary to describe in detail a coupler at one end of the car, and in describing the general operation of the coupler to consider the action and operation of two couplers.

The reference numeral 1 denotes a car having a train line pipe 2 provided with the ordinary angle cock 3 and flexible connection 4. The train line pipe 2 adjacent to the angle cock 3 is provided with a nipple 5 and connected to said nipple by a clamp 6 or other fastening means is a hose 7, having the opposite end thereof clamped, as at 8 to the short arm 9 of an elbow pipe 10. The elbow pipe 10 is slidably mounted in a bearing 11 carried by a hanger 12 suitably connected to the end of the car 1. The forward end of the elbow pipe 10 is provided with a valve body 13 having a bushing 14, said valve body and bushing being in communication with the elbow pipe 10. Rotatably mounted in the bushing 14 of the valve body 13 is a hollow valve plug 15 having an opening 16 adapted to register with the opening 17 of the bushing 14 and thereby establish communication between the interior of the plug 15 and the elbow pipe 10. The hollow plug 15 is in communication with tubular extensions 18 and 19, the former being encircled by a coiled compression spring 20 arranged within a cap 21 mounted in the end of the valve body 13, said compression spring normally retaining the valve plug seated in the bushing 14.

Coupled to the outer ends of the extensions 18 and 19, as at 22 and 23 respectively are the lateral tubular portions 24 of a coupling head 25, the coupler head being in communication with the lateral portions 24 by tubular curved branches 26. The lateral portions 24 are connected by a yoke 27 that extends under the elbow pipe 10 and normally engages the under side of said pipe to limit the downward movement of the coupler head 25 but allowing said head to swing upwardly to the position shown in Fig. 2 of the drawings. The coupler head is cylindrical and has one side thereof provided with a segment-shaped groove 28 having an open end 29, while the opposite side of the head is provided with a circular opening 30 in communication with the tubular branches 26 through the medium of a port 31 formed in the head 25. An ordinary gasket 32 is seated in the circular opening 30. The coupler head 25 has an extension 33 providing a pocket 34 into which is adapted to ride a coupler head of an adjacent car, the extension 33 having guards 35, 36 and 37, the guard 35 deflecting an inwardly moving coupler head downwardly and the guards 36 and 37 deflecting the inwardly moving coupler head to the right and left, whereby the coupler head will positively enter the pocket 34, thereby compensating for any slight irregularities in the position of coupler heads about to be connected. To lock the coupler heads 25 together, the inner side of the extension 33 has a lug or pin 38 adapted to ride into the segment-shaped groove 28, said pin and groove holding the coupler heads together while they are swung upwardly to the position shown in dotted lines in Fig. 3 of the drawings.

To lock the coupler in a rigid position when not in use, the rear end of the elbow pipe 10 is provided with a vertical arm 39 and the upper end of this arm has a spring pressed latch 40 adapted to engage in a keeper plate 41 carried by the bottom of the car 1. The spring pressed latch 40 is connected by a rod 42 to the short arm 43 of a bell crank lever 44, said bell crank lever being pivotally mounted by a pin 45 in apertured lugs 46, carried by the arm 39. The hanger 12 has an additional bearing 47 and slidably mounted in said bearing is a rod 48 having the forward end thereof provided with a buffer 49 and the rear end with a key 50, said key preventing the rod from becoming accidentally disengaged from the hanger 12. The forward end of the rod 48 is adapted to be struck by a similar rod of another car and the rear end of said rod to impinge the bell crank lever 44 and release the latch 40. When the latch 40 is released, the elbow pipe 10 can slide in the bearing 11, but is normally held by a retractile spring 51 connected to an apertured lug 52 carried by the bearing 11, and to an apertured lug 53 carried by the short arm 9 of the elbow pipe 10, said spring compensating for the vibrations of the car when in action.

With the coupler in the position shown in Fig. 4 of the drawings, the supply of air to the hollow plug 15 is shut off by said plug, and immediately upon two coupler heads contacting and swinging to the vertical position shown in Figs. 2 and 3, the valve plugs 15 are rotated approximately one-quarter of a revolution, establishing communication between said plugs and the elbow pipes 10 and allowing air to pass from one train line through the hose 7, elbow pipe 10, plug 15, branches 26 and coupler head 25 to an adjoining coupler head, an airtight connection being established through the medium of the gaskets 32, similar to the present type of air brake coupler head.

From the foregoing it will be observed that a coupler in accordance with this invention embodies a swiveled coupler head having a valve plug that controls the inlet of air to the coupler head, the movement of the coupler head either opening or closing the air line pipe of a car, together with novel means for holding the coupler rigid or in position that it can adjust itself to the movement of the car.

What I claim is:—

1. In an automatic air brake coupler, the combination with cars provided with train pipes, of hangers carried by said cars, elbow pipes movably supported by said hangers and in communication with said train line pipes, valves carried by said elbow pipes, coupler heads carried by said valves and in communication therewith and adapted by a coupling movement to open said valves, and means in connection with said hangers and said elbow pipes for slidingly holding said elbow pipes in said hangers.

2. In an automatic air brake coupler, the combination with cars provided with train pipes, of hangers carried by said cars, elbow pipes movably supported by said hangers and in communication with said train line pipes, valves carried by said elbow pipes, coupler heads carried by said valves and in communication therewith and adapted by a coupling movement to open said valves, means in connection with said hangers and said elbow pipes for slidingly holding said elbow pipes in said hangers, and means in connection with said hangers and said elbow pipes adapted to lock said elbow pipes within said hangers.

3. In an automatic air brake coupler, the combination with cars provided with train pipes, of elbow pipes flexibly connected to said train line pipes, valve bodies carried by said elbow pipes, plugs movably mounted in said bodies, coupler heads carried by said plugs and in communication therewith and adapted by a coupling movement to establish communication between said train line pipes and said coupler heads.

In testimony whereof I affix my signature in the presence of two witnesses.

THOMAS E. JENNINGS.

Witnesses:
 RALPH H. WOLF,
 NOAH E. RHOADES.